April 14, 1925.
E. S. MARSH
1,533,200
TIME CONTROLLED REGULATING DEVICE
Filed July 12, 1920   2 Sheets-Sheet 1
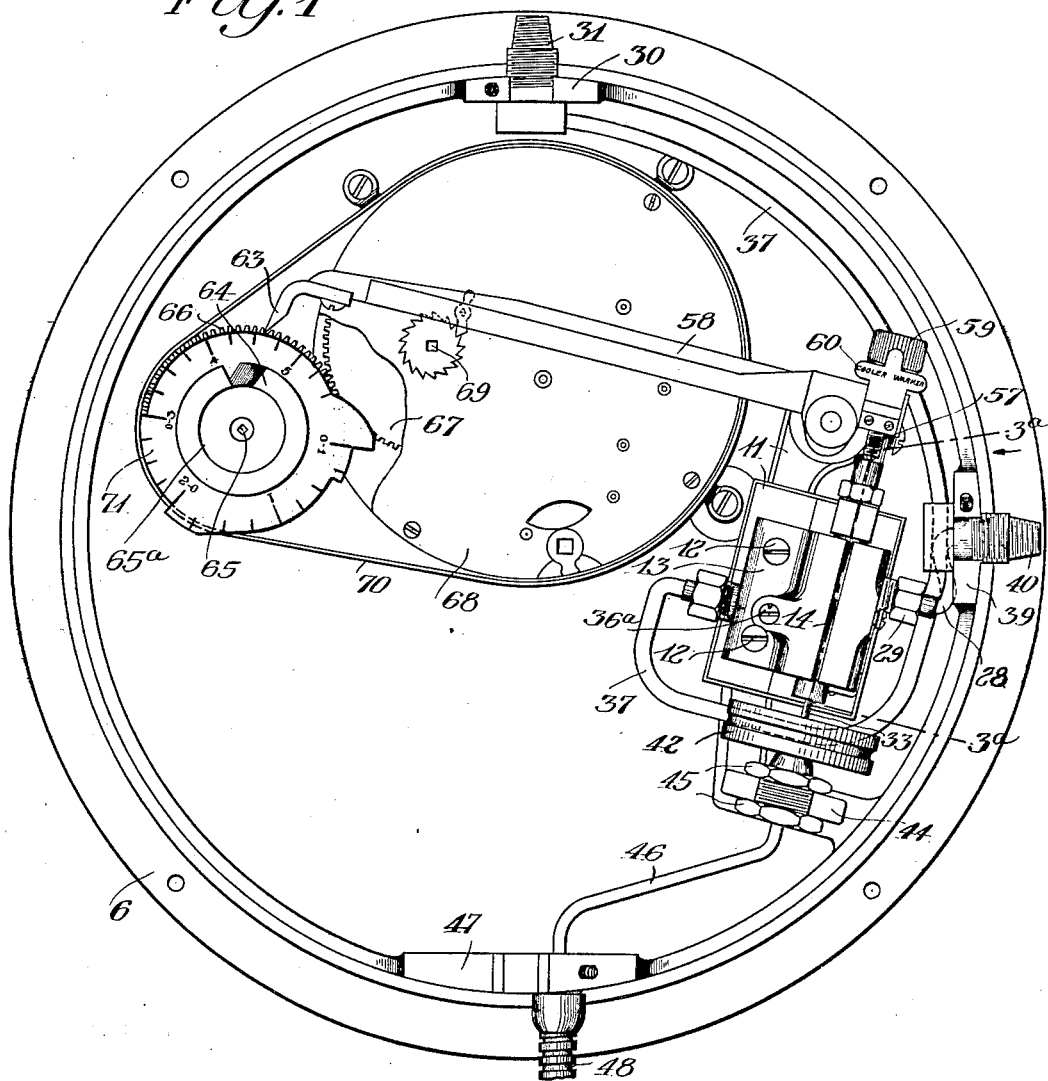
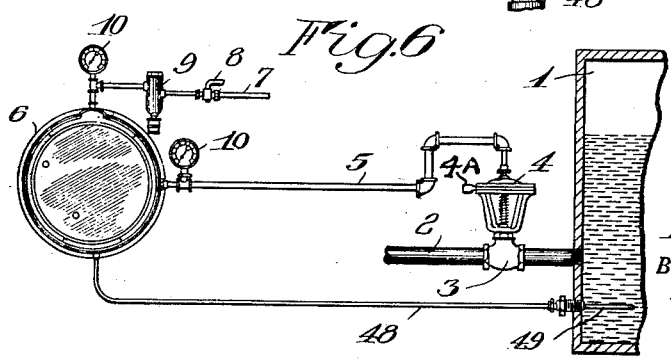
INVENTOR.
Edward S. Marsh
BY
his ATTORNEY April 14, 1925.  
E. S. MARSH  
1,533,200  
TIME CONTROLLED REGULATING DEVICE  
Filed July 12, 1920   2 Sheets-Sheet 2
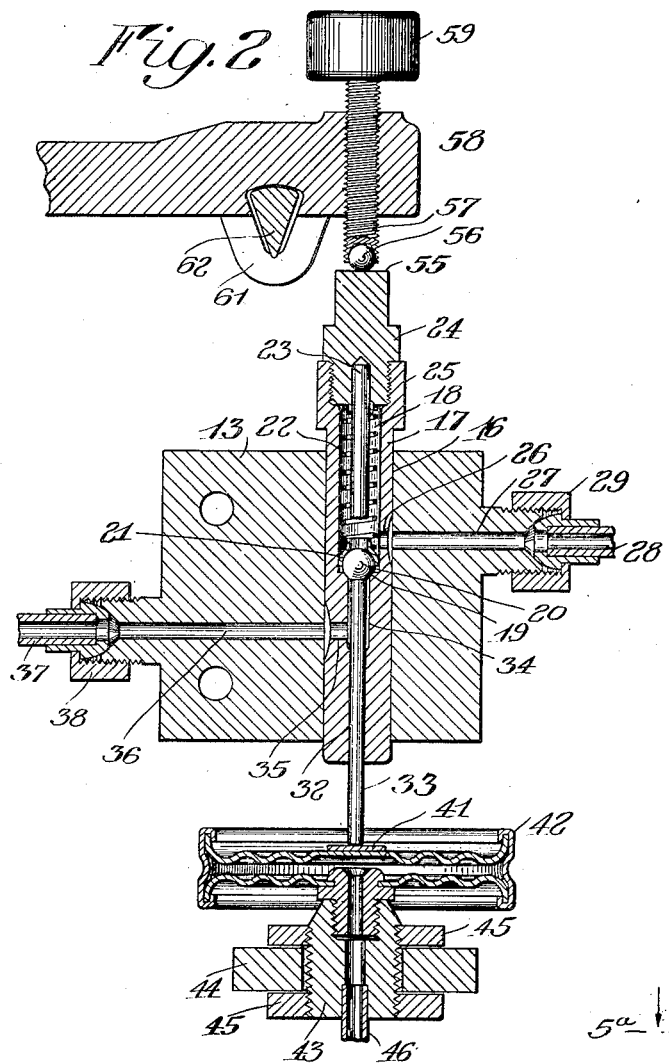
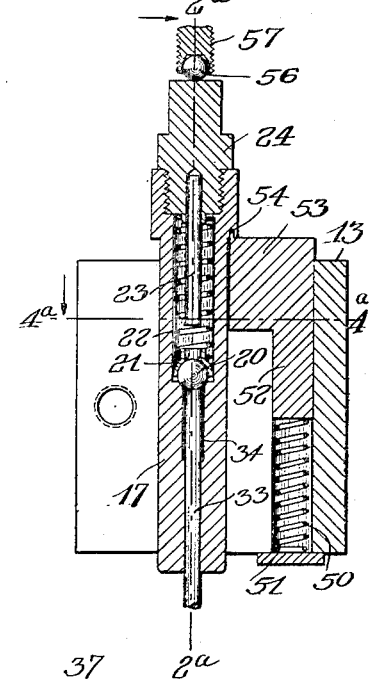
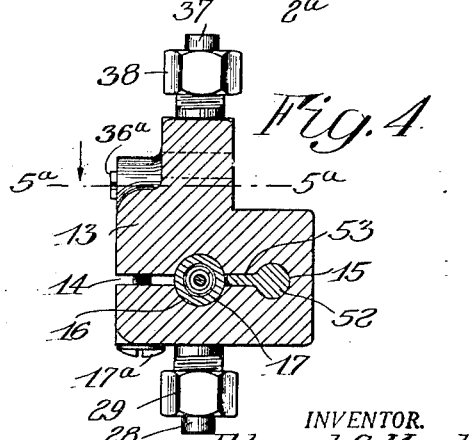
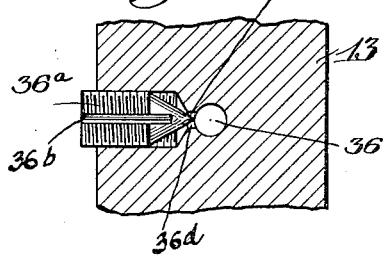
INVENTOR.
Edward S. Marsh
BY
his ATTORNEY Patented Apr. 14, 1925.

1,533,200

UNITED STATES PATENT OFFICE.

EDWARD S. MARSH, OF ROCHESTER, NEW YORK, ASSIGNOR TO TAYLOR INSTRUMENT COMPANIES, OF ROCHESTER, NEW YORK, A CORPORATION OF NEW YORK.

TIME-CONTROLLED REGULATING DEVICE.

Application filed July 12, 1920. Serial No. 395,618.

*To all whom it may concern:*

Be it known that I, EDWARD S. MARSH, a citizen of the United States, residing at Rochester, in the county of Monroe and State of New York, have invented certain new and useful Improvements in Time-Controlled Regulating Devices; and I do hereby declare the following to be a full, clear, and exact description of the same, reference being had to the accompanying drawings, forming a part of this specification, and to the reference numerals marked thereon.

This invention has to do with regulating devices such as are employed for regulating the temperature or pressure conditions within a chamber or container to be controlled, and more particularly, with devices of this character in which the regulation is variably controlled with respect to time, the chief object of the invention being to provide an improved device of the above character having to a greater degree the advantages of sensitiveness and accuracy in regulation, and convenience in operation and adjustment, together with a simple and durable character of construction and arrangement of parts. To these and other ends the invention consists in certain improvements and combinations of parts, all as will be hereinafter more fully described, the novel features being pointed out in the claims at the end of the specification.

In the drawings:

Figure 1 is an elevational view of the main parts of a regulating device embodying the present invention.

Figure 2 is an enlarged section on the line 2ª—2ª of Figure 3.

Figure 3 is an enlarged sectional view on the line 3ª—3ª of Figure 1.

Figure 4 is an enlarged section on the line 4ª—4ª of Figure 3.

Figure 5 is an enlarged detail sectional view on line 5ª—5ª of Figure 4 showing an exhaust or venting device, and, Figure 6 is an elevation reduced in scale and partly in section showing the arrangement of the apparatus as a whole.

Similar reference marks throughout the several views indicate the same parts.

This invention is capable of various adaptations and uses, and the particular embodiment selected for the purposes of the present disclosure, to illustrate the principle involved and its best mode of application, is adapted for use in conjunction with apparatus for heating a chamber or container, such as is used in various processes, for variably regulating the degree of temperature in such container as particular conditions or processes may require. Referring to the drawings and more particularly to Figure 6, 1 indicates a chamber or container to be controlled, having a pipe line 2 for supplying fluid thereto, as for example, a heating or cooling medium, which line is controlled by a main valve 3 of the well known variety arranged for automatic operation by the usual or any suitable fluid pressure actuating device or diaphragm 4. A fluid pressure line 5 connects the valve actuating means 4 with the regulating device proper contained within the casing 6, to which fluid under pressure is conveyed by a line 7 having a valve 8 and a moisture trap 9, gauges 10 being inserted in lines 5 and 7 if desired to indicate the pressures therein.

Referring to Figure 1, the regulating device proper is shown within the enclosing and supporting casing 6 and comprises, preferably, a bracket indicated generally at 11 on which is secured as by means of screws 12 a stationary frame or housing 13 formed with an incision or kerf 14 enlarged at its inner end to provide a bore 15 for a purpose which will presently appear. The kerf is also enlarged adjacent its center to form a bore 16 preferably cylindrical in shape and extending through the top and bottom of the housing. Slidably fitted in bore 16 and thus supported and enclosed by the outer frame or housing 14, and protected from dirt and grit, is an inner housing 17 of substantially cylindrical shape and having at one end a central chamber 18, the lower end of which is formed to provide a secondary valve seat 19 on which is adapted to rest a secondary ball valve 20 rotatably carried in a cage or keeper 21 smaller in diameter than the chamber 18 and sliding loosely therein. Keeper 21 has fixed thereto the lower end of a coil spring 22 surrounding a guiding spindle 23 supported at its upper end in a stud 24 having its lower end threadedly engaged in the upper end of chamber 18 in the enlarged upper end 25 of the inner housing. Spring 22 has its upper end fixed to stud 24, so that the ball valve, keeper and spring may be conveniently removed as a unit with the stud, for cleaning or repair.

Means are provided for connecting the fluid pressure supply line 7 and the fluid pressure line 5 leading to the actuating device of the main valve with opposite sides of valve seat 19, comprising, preferably, a passageway 26 extending laterally through inner housing 17 above the valve seat, adjacent which passageway is a similar passageway 27 in the stationary frame or outer housing communicating therewith at one end and at its other with a pipe or conductor 28 secured to the frame by any suitable means affording a tight joint such as the gland nut 29. Pipe 28 is carried to a lug 30 at one side of the casing and communicates with a connection or union 31 supported therein to which the pipe line 7 is attached. Communicating with the lower end of chamber 18 of the inner housing and concentric with the valve seat 19 is a small bore 32 in which is closely and slidably fitted a rod or spindle 33 extending upwardly adjacent the secondary valve for the purpose of lifting the same from its seat when the spindle is moved upwardly by means coacting with its lower end and presently to be described.

Spindle 33 is cup shaped at its upper end to afford a socket for the ball, and as the spindle is guided to move concentrically of the valve seat it thus guides the ball concentrically of the seat in raising the same to open the valve. The advantage of this feature is that it prevents fluttering of the valve in opening. It is to be noted also that the ball being separate from the spindle finds its seat 19 accurately when the spindle is withdrawn downwardly. This construction provides an accurate valve affording very close regulation, the importance of which is well understood in the art.

The upper end of the spindle bore 32 is enlarged as at 34 and with this enlargement communicates a pasageway 35 extending laterally through the inner housing on the side opposite the passageway 26. Passageway 35 thus communicates through the enlargement 34 with the lower side of valve seat 19, and at its outer end communicates with a passageway 36 in the frame or outer housing extending exteriorly of the latter and having connected therewith a pipe or conductor 37 secured to the housing by any suitable means such as the gland nut 38, pipe 37 being carried adjacent the side of the casing 6 to a supporting bracket 39 thereon and connected with a union or joint 40 supported in the bracket with which latter pipe line 5 is connected. The exterior of the inner housing 17 is preferably formed with vertically elongated depressions or ports at the outer ends of passageways 26 and 35 therein to provide for continuous communication between the latter and the passageways 27 and 36 respectively of the stationary outer housing or frame during vertical sliding movement of the inner housing in the outer housing. This construction thus provides communication at all times from the source of fluid pressure to one side of valve seat 19 and from the opposite side of the latter with the fluid pressure line 5 leading to the actuating means of the main valve, such communication being governed by the positions of the secondary valve 20 which, as seen, is movable in chamber 18, and by the position of its valve seat 19 which of course moves with the movement of the inner housing.

The means for controlling the position of the secondary valve 20 comprises preferably a pressure operated member or capsular diaphragm 42 of the usual or any suitable type which is shown as supported on a plug 43 carried in a bracket 44 and clamped thereto by means of locking nuts 45. Plug 43 is provided with a bore communicating with the interior of the diaphragm and with a pipe or conductor 46 extending adjacent a lug 47 on casing 6 where it is supported and connected in any suitable manner with a conductor 48, preferably of the usual flexible type of construction which is carried to the container 1 and connected with a bulb 49 extending within the latter. The latter part together with conductor 48 and the pressure responsive diaphragm 42 are filled with any suitable expansive fluid, as well known in the art, so that variations in temperature in the container produce variations in pressure within the expansible diaphragm. The upper side of the latter moves upwardly and downwardly with increases of and decreases of pressure therein respectively, corresponding to increases and decreases of temperature in container 1, and moves spindle 33 to unseat the secondary valve or permit the same to be seated by its spring. Conductor 48 might of course be arranged to communicate directly with the interior of the container to transmit the pressure thereof to the diaphragm so as to make the latter responsive to pressures instead of temperatures.

Means are provided for venting or exhausting the air pressure in pipe line 5 on the main valve actuating means or diaphragm comprising preferably the screw 36$^a$, Figure 5, longitudinally slotted as at 36$^b$ and having a pointed end 36$^c$ entering a pin hole 36$^d$ in the side of passageway 36. By turning the screw home the point thereof entering the pin hole reduces the escape of fluid, which is so regulated as to be just sufficient to relieve the pressure on the diaphragm of the main valve when the secondary valve is closed.

The means for conjointly controlling the opening and closing of the secondary valve by controlling the movement of the inner housing and valve seat comprises preferably a coil spring 50 located within the bore 15 of the outer housing and supported at its lower end on a part 51 on the latter. The upper end of the spring bears against the lower end 52 of a part having the form shown in Figures 3 and 4 and slidable in the upper end of bore 15 and the kerf 14. As shown, part 53 has an arm extending into the kerf and provided with a projection 54 engaging in a recess in the under side of the enlargement 25 at the upper end of the inner housing, thus serving to urge the latter upwardly in its bearing in the stationary outer housing or frame and to guide or prevent rotation of the inner housing. The connection of pipes 5 and 7 to the stationary frame 13 and the use of ports between the latter and the inner housing, leave the inner housing free to move with a minimum of frictional resistance, under actuation by spring 50 and the time mechanism described below. The upper end of stud 24 of the inner housing is formed with a bearing surface 55 with which engages a ball 56 carried in a socket in the lower end of a screw 57 held on a lever 58 described below so that substantially frictionless contact is provided between the screw and inner housing. Screw 57 threadedly engages a bore in the end of the lever 58, extending through the latter and being provided at its upper end with a handle or knob 59 adjacent which is supported on bracket 11 an indicating index 60 for cooperation with any suitable graduation which may be provided if desired on the screw handle 59 to indicate the direction and degree of adjustment of the latter.

Lever 58 has a yoke 61, Figure 2, at one side of its center, or adjacent the end carrying screw 57, formed with a suitable seat for cooperation with a knife edge support 62 supported on bracket 11 so that the lever has a substantially frictionless pivotal movement on the latter. At its opposite end the lever has a point or "feeler" 63 bearing on the profile of a cam 64 detachably fixed on a spindle 65 by means of a round nut 65ᵃ which spindle carries also a gear 66 meshing with a gear 67 of any suitable time mechanism 68 which may be of the spring actuated variety conveniently wound by a stem 69. The time mechanism and gearing connected therewith are preferably enclosed within a casing 70 within the outer casing 6.

The time driven cam 64 may have a variety of sizes and configurations of outline or profile depending upon the desired control of the regulating device with respect to time. Thus the cam may be of such size and rotated at such speed by the time mechanism as to cover any desired range of time within practical limits and its surface may be designed to both rise and fall during rotation with respect to lever 58 and within the given period of time for controlling the regulating device, or, more specifically, the seat of the secondary valve to produce successive increases of opening of the valve, or successive decreases, or combinations of both such movements. The cam shown provides for operation over a period of one hour, with an abrupt rise in temperature early in the period followed by a gradual decrease in temperature and subsequently by two abrupt increases with a gradual final decrease. The eccentric mounting of lever 58, providing a long arm adjacent the cam and a short arm adjacent the valve seat, reduces the effect of any errors which may occur in the cam profile. Without such reduction small inaccuracies in the cam might vary the regulation by several degrees from the temperature desired, but with this reduction such inaccuracies are negligible and the cam does not require to be ground, thereby reducing the cost. Furthermore, the relatively greater length of the cam arm of the lever reduces the pressure of the point or "feeler" 63 on the cam and the resistance to the action of the time mechanism, thereby improving the regulation of the latter.

In operation, a cam having been provided and placed on spindle 65 of the time mechanism of suitable profile for the purpose desired, with fluid such as steam supplied to main line 2 and fluid pressure as, for example, compressed air to line 7, cam 64 is rotated by the attachment of a key to spindle 65 to bring the zero point of the cam under the lever point 63 and the time mechanism is started. The rotation of the cam by reason of its shape first allows spring 50 to raise the end of lever 58 cooperating with the inner housing, by raising the latter, so that valve seat 19 is elevated into contact with the secondary valve, seating the latter if not already seated, by lifting the same out of engagement with its operating spindle 33. Fluid pressure is thus cut off from the actuating means 4 of the main valve so that the latter is opened by its spring in the usual manner permitting fluid, as for example steam, to flow into the container to heat the same. As the temperature of the latter rises diaphragm 42 is expanded, and when the temperature attains the degree desired at the given time and provided for by the timing mechanism, spindle 33 unseats valve 20 permitting fluid pressure to flow to actuating means 4 to close the main valve and thus shut off the steam. Should the temperature then fall below that desired diaphragm 42 collapses, allowing the secondary valve to close. This shuts off the air or other auxiliary fluid pressure from main valve 3 which is then opened by its spring to admit more steam.

When it becomes desirable in point of time to admit more steam, the time actuation is such as to raise the secondary valve seat, and the spring actuated secondary valve is brought into contact therewith, thus shutting off the pressure and again allowing the actuating spring to open the main valve to permit the flow of steam to the container. Similarly, the time actuation may reduce the steam supply and the temperature or pressure responsive member 42 constantly regulates to produce the temperature desired at each instant and provided for by the time mechanism. The regulating device thus automatically admits or cuts off steam or other fluid from the container depending upon the conditions within the latter as transmitted to the secondary valve by the pressure operated diaphragm, while the time element of control, both as to duration of operation and as to the degree of temperature or pressure within the container during the period of time, is transmitted to the secondary valve seat to move the latter accordingly, so that the timing mechanism and the pressure mechanism operate simultaneously and conjointly to regulate conditions within the container as desired at any given instant in a period of any desired length. It has been found preferable in order to reduce the operating range and increase the effectiveness of diaphragm 42 and cam 64, to employ the latter for regulation merely over the usual range of temperatures, and to effect complete closure of the main valve by additional time operated mechanism not shown. Valve 3 is therefore provided with the double actuating diaphragm arrangement well known in the art, and with the additional connection 4ª for such mechanism which, at the time set for the end of the operation, completely closed the valve.

The mechanism is so designed as previously pointed out as to afford sensitive and accurate control in the manner desired and to facilitate its adjustment to conditions and its operation. The construction and arrangement of the various parts is such as to produce a comparatively simple mechanism of a durable character not easily deranged or interfered with in its action by the accumulation of dirt or by other unfavorable conditions of use.

I claim as my invention:

1. In a regulating device, the combination with a fluid supply line and a valve controlling said line, of fluid pressure means for operating said line valve, governing means for said fluid pressure means comprising inner and outer housings, each provided with inlet and outlet ports communicating with the corresponding ports of the other of said housings, said inner housing being movable in the outer housing and provided with a secondary valve set, a secondary valve in said inner housing cooperating with said seat to control communication between said inlet and outlet ports, connections from said fluid pressure means leading to the ports of said outer housing, pressure operated means responsive to conditions within a fluid container for moving one of said secondary valve parts, and time mechanism for moving the other of said secondary valve parts.

2. In a regulating device, the combination with a fluid supply line and a valve controlling said line, of fluid pressure means for operating said line valve, governing means for said fluid pressure means comprising a stationary housing, a movable housing having a portion in sliding engagement with a portion of said housing, said housings having passageways therethrough communicating with each other during movement therebetween by means of ports in said engaging portions, a secondary valve and valve seat in said movable housing governing the passageway therein, connections from said fluid pressure means to the opposite ends of said passageway in said stationary housing, a pressure responsive member provided with means for moving said secondary valve away from said seat, and time mechanism for moving said housing and secondary valve seat.

3. In a regulating device, the combinaton with a main valve to be controlled, of fluid pressure means for actuating said valve, a source of fluid pressure, a stationary housing, a chambered housing movable in said stationary housing and formed with a secondary valve seat, a spring actuated ball valve cooperating therewith, passageways in said stationary housing connected exteriorly thereof with said source of fluid pressure and with said main valve actuating means, passageways in said movable housing communicating with opposite sides of said valve seat and with said passageways in the stationary housing, time mechanism for moving said movable housing and valve seat, a part for moving said ball valve away from its seat concentrically of the latter, and pressure responsive means for moving said part.

4. In a regulating device, the combination with a fluid supply line and a valve controlling said line, of fluid pressure means for operating said line valve, governing means for said fluid pressure means comprising a housing, a second housing slidably supported and enclosed by the latter, a secondary valve and valve seat in said second housing, connections from said fluid pressure means leading through said housings to opposite sides of said valve seat, pressure operated means responsive to conditions within a fluid container and a time mechanism, one arranged for moving said secondary valve, and the other for moving said inner housing and valve seat.

5. In a regulating device, the combination with a fluid supply line and a valve controlling said line, of fluid pressure means for operating said line valve, governing means for said fluid pressure means comprising a housing, a second housing slidably supported and enclosed by the latter, a secondary valve and valve seat in said second housing, connections from said fluid pressure means leading through said housings to opposite sides of said valve seat, pressure operated means responsive to conditions within a fluid container for moving said secondary valve, time mechanism, and an adjustable lever operatively connected with said time mechanism and with said second housing for moving the latter and said valve seat.

6. In a regulating device, the combination with a fluid supply line and a valve controlling said line, of fluid pressure means for operating said line valve, governing means for said fluid pressure means comprising, a stationary housing, a housing slidably supported by the latter, and having a chamber therein formed to provide a secondary valve seat, a secondary valve on said seat, connections from said fluid pressure means to said stationary housing, said housings having passageways therein communicating during movement of said movable housing and leading from said fluid pressure connections to opposite sides of said valve seat, pressure operated means responsive to conditions within a fluid container for moving one of said secondary valve parts, and time mechanism for moving the other secondary valve part.

7. In a regulating device, the combination with a fluid supply line and a valve controlling said line, of fluid pressure means for operating said line valve, governing means for said fluid pressure means comprising a movable inner housing having a chamber therein formed to provide a secondary valve seat, a secondary valve on said seat, an outer housing enclosing said inner housing, said housings having passageways therein communicating during movement of said inner housing and leading to opposite sides of said secondary valve seat, connections from said fluid pressure means to the passageways in said outer housing, pressure operated means responsive to conditions within a fluid container for moving said secondary valve, and time mechanism for moving said inner housing and secondary valve seat.

8. In a regulating device, the combination with a container, means for supplying a heating or cooling medium thereto, and a main valve controlling said means, of pressure actuated means for operating said main valve, a source of fluid pressure for said pressure means and governing means for said fluid pressure comprising an inner movable housing having a chamber provided with a secondary valve seat, a secondary valve on said seat, an outer housing enclosing said inner housing, said housings having passageways communicating with each other and with opposite sides of said valve seat, connections from said source of fluid pressure and said pressure means to the passageways of said outer housing, pressure responsive means connected with said container, for moving said secondary valve, and time mechanism for moving said inner housing and valve seat.

9. In a regulating device for a fluid container, the combination with a main valve for controlling the flow of fluid thereto, of fluid pressure means for actuating said main valve, a source of fluid pressure, and governing means for said fluid pressure means comprising an outer housing having passageways therein connected with said fluid pressure means and said source of pressure, a housing slidably carried in said outer housing and formed with a secondary valve seat, said inner housing having passageways therein communicating with said passageways in the outer housing and with opposite sides of said valve seat, a secondary valve on said valve seat, a spring for holding said valve on said seat, a time mechanism having a cam, a lever cooperating with said cam for moving said inner housing, a spring resisting the movement of said inner housing, pressure responsive means connected with the fluid container, means cooperating with said pressure responsive means and extending through said inner housing for moving said secondary valve.

10. In a regulating device, the combination with a main valve to be regulated, of fluid pressure means for actuating the latter, a source of fluid pressure, and governing means for said pressure means having connections therewith and with said source of pressure and comprising an outer housing, a housing slidably supported within the latter and formed with a chamber therein provided with a secondary valve seat, communicating passageways in said inner and outer housings forming said connections leading to opposite sides of said valve seat, a spring actuated secondary valve on said seat, pressure responsive means connected with a container to be regulated and having a part extending within said inner housing for unseating said secondary valve, a spring actuated member slidable in said outer housing for guiding and moving said inner housing in one direction, a lever for moving said inner housing in the other direction, a time mechanism having a cam for moving said lever.

EDWARD S. MARSH.